United States Patent
Yen et al.

(10) Patent No.: US 11,892,704 B2
(45) Date of Patent: Feb. 6, 2024

(54) LENS DEVICE

(71) Applicant: Young Optics Inc., Hsinchu (TW)

(72) Inventors: Yi-Feng Yen, Hsinchu (TW);
Chia-Chang Lee, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 285 days.

(21) Appl. No.: 17/105,529

(22) Filed: Nov. 26, 2020

(65) Prior Publication Data
US 2021/0080687 A1    Mar. 18, 2021

Related U.S. Application Data

(63) Continuation of application No. 16/181,369, filed on Nov. 6, 2018, now abandoned.

(51) Int. Cl.
*G02B 7/09* (2021.01)
*G03B 21/53* (2006.01)

(52) U.S. Cl.
CPC ............... *G02B 7/09* (2013.01); *G03B 21/53* (2013.01)

(58) Field of Classification Search
CPC ... G02B 7/09; G02B 7/04; G02B 7/08; G03B 21/53; G03B 2213/00; G03B 27/34; G03B 27/36; G03B 27/40; G03B 13/32; G03B 13/34; G03B 13/36; G03B 3/10; G03B 3/12
USPC .............. 359/823, 824, 825; 396/76; 353/76
See application file for complete search history.

(56) References Cited

U.S. PATENT DOCUMENTS

| | | | |
|---|---|---|---|
| 5,237,362 A * | 8/1993 | Ishino ...................... | G02B 7/10 396/89 |
| 2005/0207026 A1* | 9/2005 | Satodate ................ | G02B 7/102 359/696 |
| 2012/0182532 A1* | 7/2012 | Liu ......................... | G03B 21/53 353/101 |

* cited by examiner

*Primary Examiner* — Marin Pichler
(74) *Attorney, Agent, or Firm* — JCIPRNET

(57) ABSTRACT

A lens device including a lens barrel, a lens, a linear reciprocating motion mechanism, and a power machine is provided. The lens is disposed in the lens barrel. The linear reciprocating motion mechanism includes a first movable part and a second movable part. The first movable part is coupled to the lens barrel. The second movable part is coupled to the first movable part. The power machine is coupled to the second movable part to drive the second movable part to rotate, thereby driving the first movable part, and the first movable part drives the lens barrel to perform a linear reciprocating motion, wherein when the second movable part is rotated by N turns, the first movable part is rotated by one turn, and N is greater than or equal to 10.

13 Claims, 4 Drawing Sheets

LENS DEVICE

CROSS-REFERENCE TO RELATED APPLICATION

This application is a continuation application of and claims the priority benefit of U.S. patent application Ser. No. 16/181,369 filed on Nov. 6, 2018. The entirety of the above-mentioned patent application is hereby incorporated by reference herein and made a part of this specification.

BACKGROUND OF THE INVENTION

Field of the Invention

The invention relates to an optical device, and more particularly, to a lens device.

Description of Related Art

With the advancement of modern video technology, the type, function, and usage of projection devices are becoming more and more diverse, wherein in the current development, the design of projection devices is gradually miniaturized, e.g., a micro projector. In addition, in the current development, the automatic focusing system for adjusting the projection lens must use a PI controller to obtain the zero point to feed back to the control panel, and then the relative position suitable for viewing of the read image is swept by sensing an image screen via a sensor and via the joint control of the control panel so as to control the motor to drive the lens to a suitable position.

However, in the above automatic focusing system, the PI controller not only increases the cost thereof, but also increases the complexity of the control panel. In addition, in the automatic focusing system of the micro projector, the driving element and the motor are quite small, and therefore in the case of a no-reduction relationship, the torque of the driving element driving the lens is often insufficient such that the phenomenon of jamming occurs.

SUMMARY OF THE INVENTION

The invention provides a lens device that effectively reduces the complexity of the control circuit board and reduces the chance of a jam of the lens barrel on the moving path.

An embodiment of the invention provides a lens device including a lens barrel, a lens, a linear reciprocating motion mechanism, and a power machine. The lens is disposed in the lens barrel. The linear reciprocating motion mechanism includes a first movable part and a second movable part. The first movable part is coupled to the lens barrel. The second movable part is coupled to the first movable part. The power machine is coupled to the second movable part to drive the second movable part to rotate, thereby driving the first movable part, and the first movable part drives the lens barrel to perform a linear reciprocating motion; wherein when the second movable part is rotated by N turns, the first movable part is rotated by one turn, and N is greater than or equal to 10. The effect of increasing the deceleration ratio may be achieved by rotating the first movable part via the rotation of the second movable part. Therefore, the complexity of the control circuit board in the projector may be effectively reduced without the use of a PI controller. At the same time, torque may be increased via the deceleration ratio increased by the linear reciprocating motion mechanism to reduce the chance of a jam of the lens barrel on the moving path.

Another embodiment of the invention provides a lens device including a motor, a lens, a lens barrel, and a parts set. The parts set includes a follower and an active member. The active member is linked to the motor, and the follower is linked to the active member and driven by the active member to rotate. The lens barrel is linked to the follower and driven by the follower to perform a linear reciprocating motion. The lens is disposed in the lens barrel, wherein within a fixed time, a number of turns of the active member is N times of a number of turns of the follower, and a value of N is greater than or equal to 10. The effect of increasing the deceleration ratio is achieved by rotating the follower via the rotation of the active member. Therefore, the complexity of the control circuit board in the projector may be effectively reduced without the use of a PI controller. At the same time, torque may be increased via the deceleration ratio increased by the linear reciprocating motion mechanism to reduce the chance of a jam of the lens barrel on the moving path.

Based on the above, in the lens device of related embodiments of the invention, the power machine rotates the first movable part via the second movable part to move the lens barrel to change the position thereof, and the lens barrel may perform a reciprocating motion as a result. Moreover, the effect of increasing the deceleration ratio may be achieved by rotating the first movable part via the rotation of the second movable part. Therefore, the complexity of the control circuit board in the projector may be effectively reduced without the use of a PI controller. At the same time, torque may be increased via the deceleration ratio increased by the linear reciprocating motion mechanism to reduce the chance of a jam of the lens barrel on the moving path.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
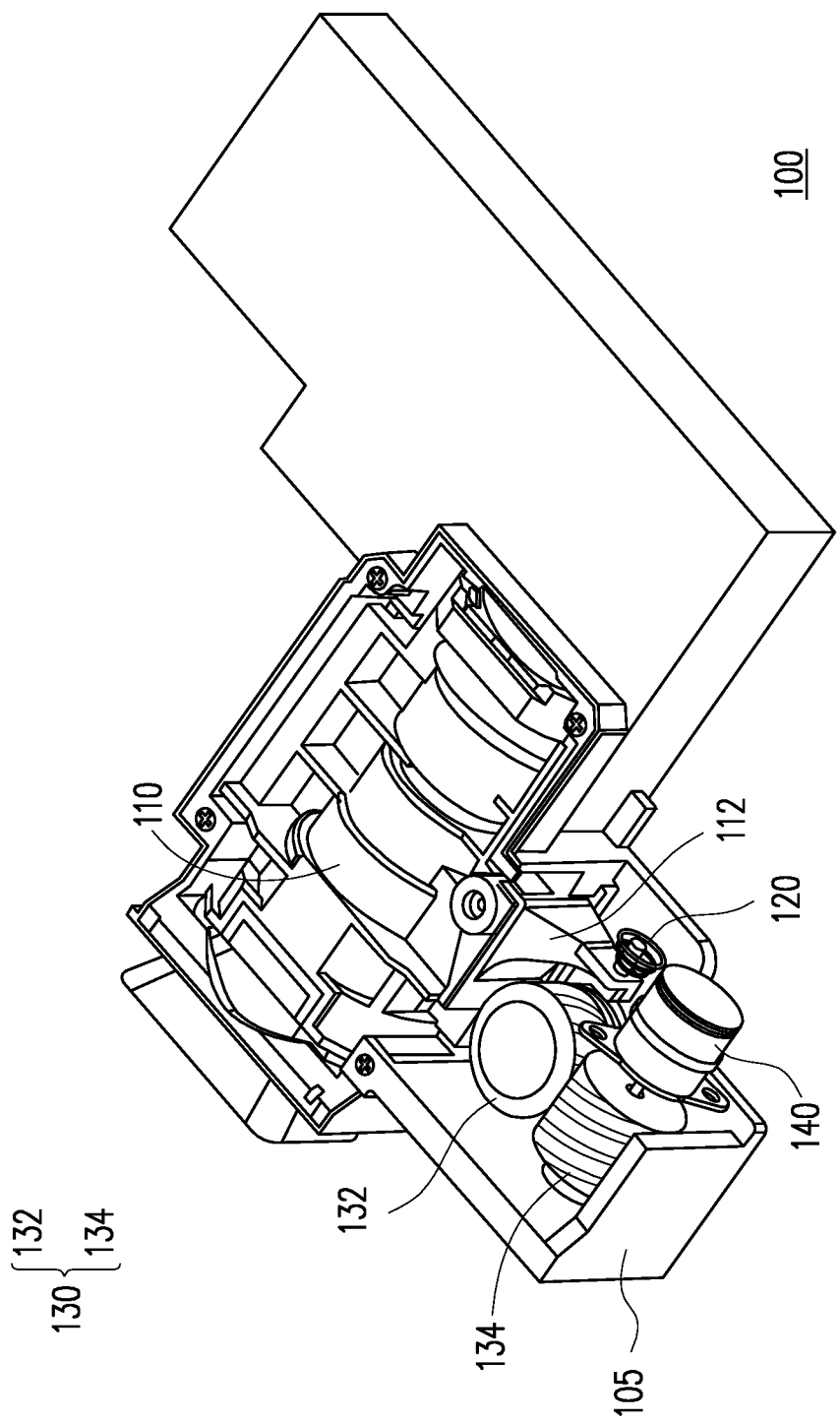
FIG. 1 is a perspective view of a lens device of an embodiment of the invention.

Reference will now be made in detail to the present embodiments of the invention, examples of which are illustrated in the accompanying drawings. Wherever possible, the same reference numbers are used in the drawings and the description to refer to the same or like parts.

Figure 2:
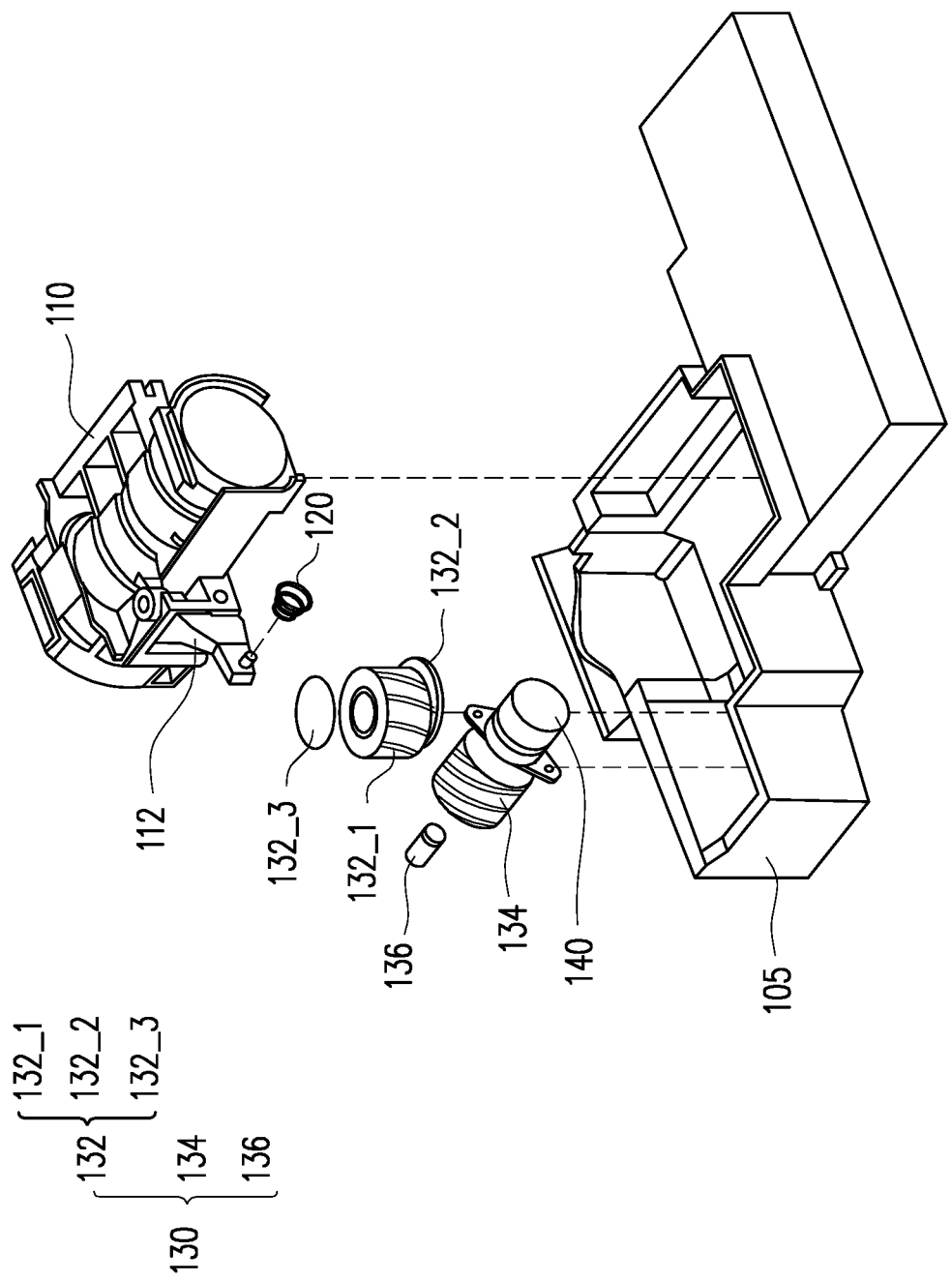
FIG. 2 is an exploded view of the lens device of FIG. 1.

FIG. 1 is a perspective view of a lens device of an embodiment of the invention. FIG. 2 is an exploded view of the lens device of FIG. 1. Please refer to FIG. 1 and FIG. 2. In the present embodiment, a lens device 100 includes a case 105, a lens barrel 110, an elastic member 120, a linear reciprocating motion mechanism 130, and a power machine 140. The lens device 100 is adapted for an optical projection device such as a regular optical projector or a PICO projector, but the invention is not limited thereto.

The case 105 is a case housing the lens barrel 110, the elastic member 120, the linear reciprocating motion mechanism 130, the power machine 140, and various elements in the lens device 100. The case 105 has a housing space, the lens barrel 110 and the elastic member 120 may be moved in the housing space, and the linear reciprocating motion mechanism 130 and the power machine 140 may be rotated or moved in the housing space.

The lens barrel 110 is adapted to receive a light beam emitted by an optical modulator (not shown) such as a digital micro-mirror device (DMD) in the projector to project an image. The lens barrel 110 is a case housing a plurality of lenses and is adapted to fix the relative positions of the lenses. In the present embodiment, the lens barrel 110 is adapted to perform a reciprocating movement between a first position and a second position in the case 105. Specifically, in the present embodiment, the lens barrel 110 performs a linear reciprocating motion, and the first position and the second position are respectively a straight line starting point and a straight line end for the motion above.

Moreover, in the present embodiment, the lens barrel 110 includes a projection 112. In the present embodiment, the projection 112 is a part of the case of the lens barrel 110. That is, in the present embodiment, the projection 112 is a hard structure protruding from the case surface of the lens barrel 110, and the shape thereof may be a rod shape, a sheet shape, a column shape, or an irregular shape, and the invention is not limited thereto. However, in other embodiments, the projection 112 may also be a hard structure that is additionally disposed on the case surface of the lens barrel 110, and the invention is not limited thereto.

The elastic member 120 is adapted to be compressed and provide a thrust to an object compressing the elastic member 120. In the present embodiment, the elastic member 120 is a spring, and the appearance thereof is, for example, a cone shape, but in other embodiments, the appearance thereof may also be a column shape or other shapes, and the invention is not limited thereto. Moreover, in some embodiments, the elastic member 120 may be any elastic and compressible object, but the invention is not limited thereto.

The linear reciprocating motion mechanism 130 includes a first movable part 132 and a second movable part 134. In the present embodiment, the first movable part 132 includes a worm gear, and the second movable part 134 includes a worm. The effect of increasing the deceleration ratio may be achieved by rotating the worm gear via the rotation of the worm. In the present embodiment, the so-called deceleration ratio is the ratio of the number of turns of the first movable part 132 to the second movable part 134. For example, when the second movable part 134 is rotated by N turns, the first movable part 132 is rotated by one turn, and the linear reciprocating motion mechanism 130 generates a deceleration ratio of N. In the present embodiment, the value of N is greater than or equal to 10. However, in other embodiments, the first movable part 132 and the second movable part 134 may be a gear set or a friction wheel set, and the deceleration ratio is a ratio of the number of turns of two gears or two friction wheels. In other words, the first movable part 132 is a follower, the second movable part 134 is an active member, the linear reciprocating motion mechanism 130 is a combination of a follower and an active member, and the active member may drive the follower to achieve the effect of generating a deceleration ratio.

The power machine 140 is adapted to provide power to rotate the object. In the present embodiment, the power machine 140 is a stepper motor. Therefore, the effect of micro-movement may be achieved by controlling the number of steps of the stepper motor and the deceleration relationship above. However, in other embodiments, the power machine 140 may be a motor such as a synchronous motor, a permanent magnet synchronous motor, or other types of power machines, and the invention is not limited thereto.

In the present embodiment, the lens barrel 110 is disposed in the case 105 and may move in the housing space of the case 105. Specifically, the case 105 of the present embodiment includes two metal rails (not shown) to carry the lens barrel 110 above, such that the lens barrel 110 may slide on the two metal rails to change the position. The elastic member 120 is disposed between the case 105 and the lens barrel 110 and is adapted to be abutted against the inner wall of the case 105 to generate a thrust to the lens barrel 110. Specifically, in the present embodiment, the elastic member 120 is disposed on the projection 112 of the lens barrel 110, and the elastic member 120 is located between the projection 112 and the case 105. Therefore, when the projection 112 applies a thrust to the case 105, the elastic member 120 is adapted to be compressed, and when the projection 112 stops applying the trust to the case 105, the elastic member 120 is abutted against the case 105 to generate a thrust to the projection 112.

The first movable part 132 is coupled to the lens barrel 110, the second movable part 134 is coupled to the first movable part 132, and the power machine 140 drives or links the second movable part 134 to rotate so as to rotate or link the first movable part 132. Specifically, when the power machine 140 is rotated, the power machine 140 drives the second movable part 134 to rotate, and then rotates the first movable part 132 via the rotation of the second movable part 134. In an embodiment, the direct connection and the indirect connection are both a type of coupling method. In an embodiment, the direct connection/contact and the indirect connection are both a type of linking.

Therefore, when the first movable part 132 is rotated, the projection 112 of the lens barrel 110 is pushed to move the position of the lens barrel 110. Specifically, in the present embodiment, the first movable part 132 includes a first rotating part 132_1 and a second rotating part 132_2, and the first rotating part 132_1 is coaxially linked with the second rotating part 132_2. In other words, the first rotating part 132_1 is a first follower, and the second rotating part 132_2 is a second follower. The first rotating part 132_1 is coupled to the second movable part 134, and the second rotating part 132_2 is abutted against the lens barrel 110. That is, the first rotating part 132_1 is a worm gear, the second movable part 134 is a worm, the second rotating part 132_2 is an eccentric cam, and the rotary axis thereof is at a non-center part. When the first rotating part 132_1 is rotated, the second rotating part 132_2 is also rotated. That is, the center of the first rotating part 132_1 is coaxial with the non-center part of the second rotating part 132_2.

When the projection 112 is pushed by the movement of the position of the contact point with the second rotating part 132_2 toward the case 105, the lens barrel 110 is driven to be changed from the first position to the second position. In contrast, when the projection 112 is reduced in force by the movement of the position of the contact point with the second rotating part 132_2 away from the case 105, the lens barrel 110 is driven to be changed from the second position to the first position. In other words, the distance between at least a portion of the lens barrels 110 and the axis of the follower is varied with the rotation of the follower. Therefore, the lens barrel 110 may perform a reciprocating motion, and therefore the focal length may be adjusted automatically or manually without the use of a PI controller. As a result, the complexity of the control circuit board in the projector may be effectively reduced. At the same time, torque may be increased via the deceleration ratio increased by the linear reciprocating motion mechanism 130 to reduce the chance of a jam of the lens barrel 110 on the moving path.

During operation, the first position may be set as the starting position first. Then, the entire itinerary when the movement of the lens barrel 110 is completed may be found via an image-sensing device (not shown) and a control circuit board (not shown) (i.e., the lens barrel 110 is moved from the first position to the second position and then moved from the second position to the first position), i.e., the image clear position when the second rotating part 132_2 is rotated by one turn, and the number of steps used by the stepper motor is calculated via the optimal image position obtained above. Then, the control circuit board may return the lens barrel 110 back to the first position and control the stepper motor by the above steps to move the lens barrel 110 to the image clear position.

In addition, in the present embodiment, the first movable part 132 may include a fixed part 132_3, such as a quick nut for fixing the rotating shaft in the first movable part 132 and limiting the position of the first movable part 132 to increase the structural stability of the first movable part 132. In addition, in the present embodiment, the linear reciprocating motion mechanism 130 may include a positioning part 136 disposed in the second movable part 134 for increasing the stability of the second movable part 134 when the power machine 140 is rotated, while reducing axial clearance.

Figure 3:
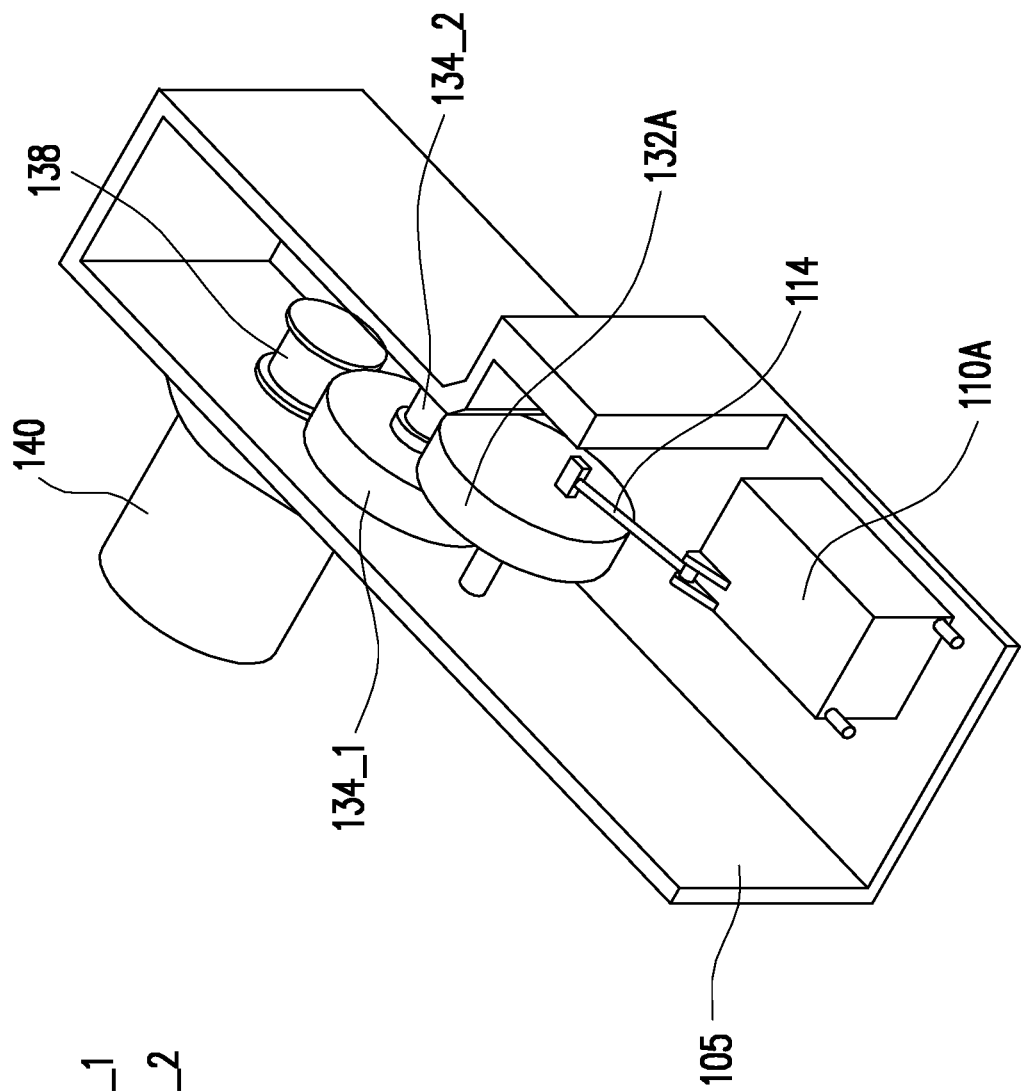
FIG. 3 is a perspective view of a lens device of another embodiment of the invention.
Figure 4:
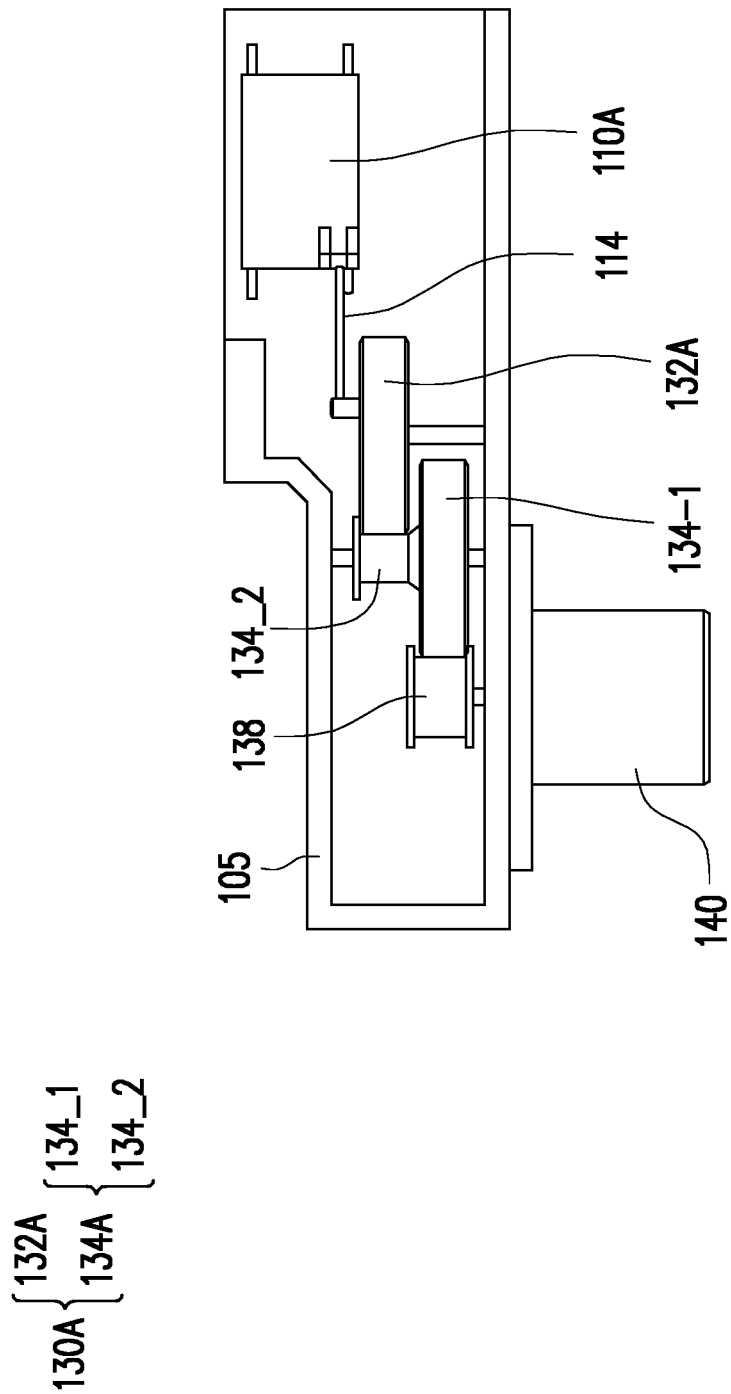
FIG. 4 is a top view of the lens device of FIG. 3.

FIG. 3 is a perspective view of a lens device of another embodiment of the invention. FIG. 4 is a top view of the lens device of FIG. 3. Please refer to FIG. 3 and FIG. 4. A lens device 200 of the present embodiment is similar to the lens device 100 of FIG. 1, except that in the present embodiment, a second movable part 134A includes a first sub-movable part 134_1 and a second sub-movable part 134_2 that are coaxial, and the lens device 200 further includes a third movable part 138 coaxial with the power machine 140. In other words, the first sub-movable part 134_1 is a first active member, the second sub-movable part 134_2 is a second active member, and the third movable part 138 is a third active member. The third movable part 138 is coupled to the first sub-movable part 134_1, and the second sub-movable part 134_2 is coupled to the first movable part 132A. In addition, the lens barrel 110A of the lens device 200 includes a connecting rod 114 connected to a non-axis center part of the first movable part 132A.

Specifically, the first movable part 132A, the first sub-movable part 134_1, the second sub-movable part 134_2, and the third movable part 138 of the linear reciprocating motion mechanism 130A adopt a friction wheel set having an active friction wheel and a driven friction wheel. The second sub-movable part 134_2 is a friction wheel and is coaxial with the second movable part 134A, and the third movable part 138 is a friction wheel and is coaxial with the power machine 140. When the power machine 140 is rotated, the third movable part 138 is driven to be rotated, and then the first sub-movable part 134_1 of the second movable part 134A is rotated by the rotation of the third movable part 138. When the first sub-movable part 134_1 is rotated, the second sub-movable part 134_2 is driven to be rotated, and then the first movable part 132A is rotated by the rotation of the second sub-movable part 134_2. Lastly, the connecting rod 114 is driven by the rotation of the first movable part 132A to move the lens barrel 110A.

During operation, the first position may be set as the starting position first. Then, the entire itinerary when the movement of the lens barrel 110A is completed may be found via an image-sensing device and a control circuit board (i.e., the lens barrel 110A is moved from the first position to the second position and then moved from the second position to the first position), i.e., the image clear position when the first movable part 132A is rotated by one turn, and the number of steps used by the stepper motor is calculated via the image clear position obtained above. Then, the control circuit board may return the lens barrel 110A back to the first position and control the stepper motor by the above steps to move the lens barrel 110A to the image clear position.

Therefore, the lens barrel 110A may perform a reciprocating motion, such that the focal length may be adjusted without a PI controller. In addition, it is worth mentioning that in the present embodiment, the circumference length of the second sub-movable part 134_2 may be smaller than the circumference length of the third movable part 138 to further increase the effect of deceleration ratio by driving the first movable part 132A via the second sub-movable part 134_2. In the present embodiment, the deceleration ratio is the ratio of the number of turns of the first movable part 132A to the first sub-movable part 134_1. As a result, the complexity of the control circuit board in the projector may be effectively reduced. At the same time, torque may be increased via the deceleration ratio increased by the linear reciprocating motion mechanism 130A to reduce the chance of a jam of the lens barrel 110A on the moving path.

Based on the above, in the lens device of related embodiments of the invention, the power machine rotates the first movable part via the second movable part to move the lens barrel to change the position thereof, and the lens barrel may perform a reciprocating motion as a result. Moreover, the effect of increasing the deceleration ratio may be achieved by rotating the first movable part via the rotation of the second movable part. Therefore, the complexity of the control circuit board in the projector may be effectively reduced without the use of a PI controller. At the same time, torque may be increased via the deceleration ratio increased by the linear reciprocating motion mechanism to reduce the chance of a jam of the lens barrel on the moving path.

It will be apparent to those skilled in the art that various modifications and variations can be made to the structure described in the disclosure without departing from the scope or spirit of the disclosure. In view of the foregoing, it is intended that the disclosure cover modifications and variations provided they fall within the scope of the following claims and their equivalents.

What is claimed is:
1. A lens device, comprising:
a lens barrel;
a lens disposed in the lens barrel;
a linear reciprocating motion mechanism, comprising:
a first movable part coupled to the lens barrel; and
a second movable part coupled to the first movable part; and
a power machine coupled to the second movable part to be configured to drive the second movable part to rotate, thereby driving the first movable part, and the first movable part is configured to drive the lens barrel to perform a linear reciprocating motion, wherein the second movable part is rotatable N turns by the power machine, the first movable part is rotated by one turn, and N is greater than or equal to 10, wherein the first movable part comprises a first rotating part and a second rotating part, a rotating axis of the first rotating part is at the center of the first rotating part, a rotating axis of the second rotating part is at the non-center of the second rotating part, the rotating axis of the first rotating part is coaxial with the rotating axis of the second rotating part, and the second rotating part is abutted against the lens barrel.

2. The lens device according to claim 1, wherein the lens device further comprises a case, the lens barrel comprises a projection, and the lens barrel is disposed in the case, wherein the first movable part is configured to rotate and push the projection to move the lens barrel.

3. The lens device according to claim 2, wherein the shape of the projection is selected from the group of a rod shape, a sheet shape, a column shape, or an irregular shape.

4. The lens device according to claim 1, wherein the lens device further comprises a case, and the lens device comprises an elastic member disposed between the case and the lens barrel.

5. The lens device according to claim 1, wherein the second movable part comprises a first sub-movable part and a second sub-movable part that are coaxial, the lens device further comprises a third movable part coaxial with the power machine, the third movable part is coupled to the first sub-movable part, and the second sub-movable part is coupled to the first movable part.

6. The lens device according to claim 1, wherein the first movable part or the second movable part includes a gear set.

7. The lens device according to claim 1, wherein the first movable part or the second movable part includes a friction wheel set.

8. The lens device according to claim 1, wherein a power machine is chosen from the group of a step motor, a synchronous motor, and a permanent magnet synchronous motor.

9. A lens device, comprising:
a lens barrel;
a lens disposed in the lens barrel;
a linear reciprocating motion mechanism, comprising:
a first movable part coupled to the lens barrel; and
a second movable part coupled to the first movable part; and
a power machine coupled to the second movable part to be configured to drive the second movable part to rotate along a second axis, thereby driving the first movable part to rotate along a first axis, and the first movable part is configured to drive the lens barrel to perform a linear reciprocating motion along a displacement direction that is non-parallel to the first axis, wherein the second movable part is rotatable N turns by the power machine, the first movable part is rotated by one turn, and N is greater than or equal to 10, wherein the first movable part includes a worm gear, and the second movable part includes a worm; and wherein the first movable part comprises a first rotating part and a second rotating part, a rotating axis of the first rotating part is at the center of the first rotating part, a rotating axis of the second rotating part is at the non-center of the second rotating part, the rotating axis of the first rotating part is coaxial with the rotating axis of the second rotating part, and the second rotating part is abutted against the lens barrel.

10. The lens device according to claim 9, wherein the lens device further comprises a case, the lens barrel comprises a projection, and the lens barrel is disposed in the case, wherein the first movable part is configured to rotate and push the projection to move the lens barrel.

11. The lens device according to claim 10, wherein the shape of the projection is selected from the group of a rod shape, a sheet shape, a column shape, or an irregular shape.

12. The lens device according to claim 9, wherein the lens device further comprises a case, and the lens device comprises an elastic member disposed between the case and the lens barrel.

13. A lens device, comprising:
a lens barrel;
a lens disposed in the lens barrel;
a linear reciprocating motion mechanism, comprising:
a first movable part coupled to the lens barrel; and
a second movable part coupled to the first movable part; and
a power machine coupled to the second movable part to be configured to drive the second movable part to rotate, thereby driving the first movable part, and the first movable part is configured to drive the lens barrel to perform a linear reciprocating motion, wherein the second movable part is rotatable N turns by the power machine, the first movable part is rotated by one turn, and N is greater than or equal to 10, wherein the first movable part comprises a first rotating part and a second rotating part, the second rotating part is an eccentric cam, a center rotating axis of the first rotating part is coaxial with a non-center rotating axis of the second rotating part, and the second rotating part is abutted against the lens barrel.

* * * * *